United States Patent [19]

Darnell et al.

[11] 4,409,195

[45] * Oct. 11, 1983

[54] PURIFICATION OF SILICON SOURCE MATERIALS

[75] Inventors: Robert D. Darnell; William M. Ingle, both of Phoenix, Ariz.

[73] Assignee: Motorola, Inc., Schaumburg, Ill.

[*] Notice: The portion of the term of this patent subsequent to Feb. 15, 2000 has been disclaimed.

[21] Appl. No.: 409,391

[22] Filed: Aug. 19, 1982

Related U.S. Application Data

[63] Continuation-in-part of Ser. No. 273,519, Jun. 15, 1981, Pat. No. 4,374,110.

[51] Int. Cl.$^3$ ............................................. C01B 33/107
[52] U.S. Cl. ..................................... 423/342; 423/277; 423/300; 423/304; 423/326; 423/327; 423/341
[58] Field of Search ............... 423/341, 342, 348, 277, 423/300, 304, 326, 327

[56] References Cited

U.S. PATENT DOCUMENTS 3,252,752  5/1966  Pohl ..................................... 423/342
3,540,861  11/1970  Bradley et al. ..................... 423/342
3,871,872  3/1975  Downing ............................ 423/348

FOREIGN PATENT DOCUMENTS 38-22262  10/1963  Japan ................................... 423/342

*Primary Examiner*—Jack Cooper
*Attorney, Agent, or Firm*—John A. Fisher

[57] ABSTRACT

A process is disclosed for the purification of trichlorosilane and other silicon source materials. Trace impurities of boron and phosphorous are removed from trichlorosilane or dichlorosilane by reacting small amounts of oxygen with the trichlorosilane or dichlorosilane at a temperature between about 60° C. and 300° C. The oxygen reacts with the Si—H bond in HSiCl$_3$ or H$_2$SiCl$_2$ to form a "SiOH" species which in turn complexes impurities such as BCl$_3$ or PCl$_3$ present in the chlorosilane. Purification of the chlorosilane is then easily accomplished during a subsequent distillation step which separates the purified chlorosilane from the less volatile complexed boron or phosphorous compounds.

11 Claims, 2 Drawing Figures

PURIFICATION OF SILICON SOURCE MATERIALS

This application is a continuation-in-part of U.S. application Ser. No. 273,519 filed June 15, 1981, now U.S. Pat. No. 4,374,110.

BACKGROUND OF THE INVENTION

This invention relates in general to a process for purifying silicon source materials and more specifically to a process for removing impurities from trichlorosilane or dichlorosilane or from mixtures of trichlorosilane and silicon tetrachloride and/or dichlorosilane.

Large quantities of polycrystalline silicon are produced by the hydrogen reduction of a silicon bearing reactant gas. For example, in a commonly used process trichlorosilane or mixtures of trichlorosilane with other silicon bearing reactants such as silicon tetrachloride and dichlorosilane are reduced to deposit polycrystalline silicon on a heated filament. In the semiconductor industry it is required that the polycrystalline silicon be of extremely high purity. This in turn requires that the silicon source gas be of high purity and be free from trace impurities.

Most impurities can be readily removed from trichlorosilane, dichlorosilane or silicon tetrachloride by conventional distillation techniques. Trace impurities of many primary dopants, however, are not easily removed by distillation. The primary dopants, the elements of group III and group V, include, for example, boron, phosphorus, arsenic and aluminum. All of these dopants are present in fairly high concentrations in the starting metallurgical grade silicon from which the silicon source material is produced. Additionally, both boron and aluminum are present in the quartz of the bell jar in which the polycrystalline deposition takes place and can be leached from the quartz and enter the reactant gas stream. Still further, dopant impurities including phosphorus, boron and aluminum are found in and can be leached from the metal pipes and seals of the deposition reactor. The impurities are usually present in the form of chlorides or hydrides of the dopant element such as $BCl_3$, $B_2H_6$, $PCl_3$, $PH_3$, $AsCl_3$, $AsH_3$ and $AlCl_3$ or as intermediate compounds containing both H and Cl. Complexed chloride may also be present, for example chlorides containing both boron and aluminum. To reduce such contaminants to an acceptably low level by distillation would require several sequential distillation steps. It is desirable to have a purification process which achieves a still higher level of purification, unobtainable by distillation alone, which does not require the time and expense of multiple distillations.

Other processes have been proposed for purifying trichlorosilane. In one process, for example, $BCl_3$ present as an impurity in $HSiCl_3$ is complexed by a hydrolysis process in which water vapor is passed over the surface of the trichlorosilane. The purified $HSiCl_3$ is then separated from the partially hydrolyzed polysiloxane residue by distillation. When this type of purification is carried out in an operating system, however, the system can be quickly clogged up by the copious amounts of solid polysiloxane residue which are formed.

It has also been suggested that elemental boron (or phosphorous) can be removed from $HSiCl_3$ by the addition of iodine or bromine to the $HSiCl_3$. The boron (or phosphorous) reacts with the iodine or bromine to form iodides or bromides which are readily separated from $HSiCl_3$ by distillation. This purification technique, however, is not effective unless the boron (or phosphorous) is in the elemental state. Thus in most applications this technique is ineffective for the removal of boron and phosphorous compounds.

Because of the shortcomings of the prior art processes it has become necessary to develope a novel and improved purification system which will provide the high purity silicon source reactants necessary in the semiconductor industry.

It is therefore an object of this invention to provide an improved process for purifying silicon source materials.

It is another object of this invention to provide an improved process for purifying trichlorosilane.

It is another object of this invention to provide an improved process for purifying dichlorosilane.

It is a further object of this invention to provide an improved process for purifying trichlorosilane admixed with other silicon source gases in the recovery loop of a polycrystalline silicon production process.

It is a still further object of this invention to provide an improved process for purifying mixtures of trichlorosilane and silicon tetrachloride and/or dichlorosilane.

It is another object of this invention to provide an improved process for removing boron and phosphorous impurities from silicon source gases.

BRIEF SUMMARY OF THE INVENTION

The foregoing and other objects are achieved in the present invention through the use of a novel purification system employing the partial oxidation of the silicon source gas. In one embodiment of the invention silicon source material including dichlorosilane or trichlorosilane is purified by reacting the silicon source material with small quantities of oxygen. The siloxane complex formed by this oxidation reaction includes impurities which had been admixed with the source material; the complex is easily separated from the source material to leave a purified source material. Preferably about 0.01 to 0.2 mole percent of oxygen is used in the reaction and the reaction is carried out at a temperature between about 60° C. and 500° C.

Lower concentrations of oxygen also complex impurities in the source material, but are less effective. Concentrations of oxygen greater than about 1.0 mole percent consume larger fractions of the source material without further enhancing the purification.

DETAILED DESCRIPTION OF PREFERRED EMBODIMENTS

Figure 1:
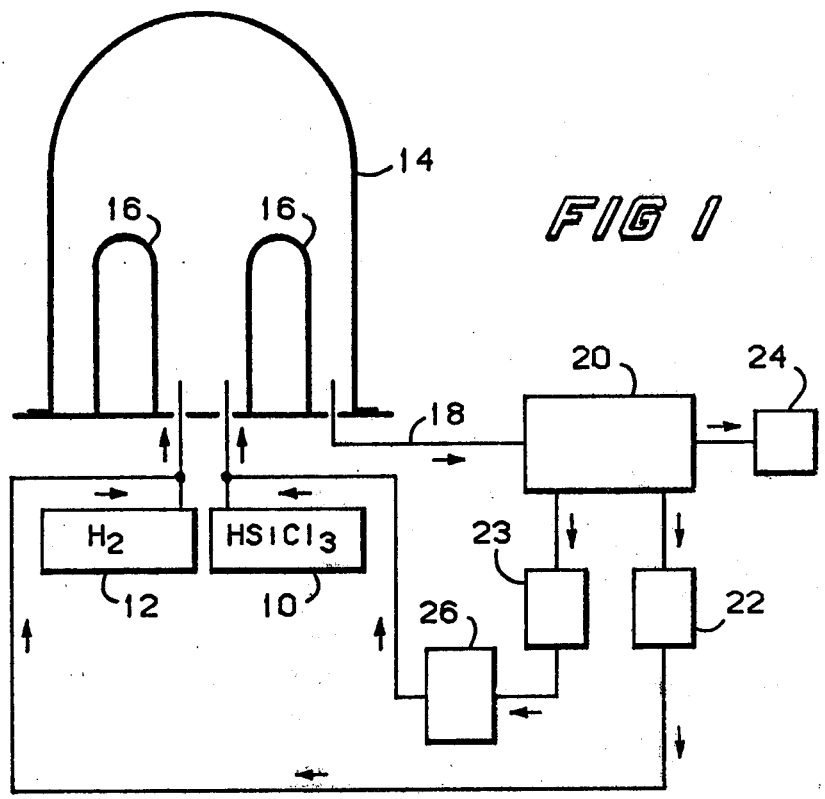
FIG. 1 illustrates the flow and recycling of reactants in a polycrystalline deposition cycle.

The conventional polycrystalline silicon deposition process is illustrated in FIG. 1. Initially trichlorosilane 10 and hydrogen 12 are injected into a reactor bell jar 14. Within the bell jar are heated filaments 16. The hydrogen and trichlorosilane react at the surface of the filaments to deposit polycrystalline silicon. By-products and unreacted trichlorosilane and hydrogen are exhausted from the bell jar at 18. The effluent includes, besides hydrogen and trichlorosilane, hydrogen chloride, silicon tetrachloride, dichlorosilane, other silicon bearing compounds, and those portions of the impurities which were originally contained in the trichlorosilane and which were not incorporated in the deposited polycrystalline silicon. The effluent is processed at 20 to separate out hydrogen 22, silicon bearing reactants 23, and hydrogen chloride 24. The hydrogen and silicon bearing reactants are recycled as inputs to the silicon deposition process. Makeup amounts of trichlorosilane and hydrogen are added to the silicon bearing effluent.

Before the silicon bearing effluent is returned to the reactor chamber, it is possible to process the effluent through a purification operation indicated schematically at 26. In the past, this purification has been accomplished by one or more distillation steps. While distillation is effective in removing certain impurities, it is relatively inefficient in removing trace amounts of primary dopants.

Trace amounts of primary dopants including boron, phosphorous, arsenic and aluminum are typically present in the incoming trichlorosilane. A portion of these impurities is deposited with the polycrystalline silicon as a dopant. The remaining impurities enter the recycling loop along with dopant impurities leached from the reactor and are subsequently returned to the reactor with the reactants unless removed in some purification step. The amount of impurities in the recycle loop builds up as the process continues. Although the amount of impurities present in the incoming trichlorosilane may be low enough to not have an adverse doping effect of the deposited polycrystalline silicon the amount of impurities resulting from the build up can have such a deleterious effect.

In accordance with the invention, an improved purification step specifically for removing primary dopants and especially boron and phosphorous from trichlorosilane, dichlorosilane or other silicon bearing reactants including mixtures of trichlorosilane with silicon tetrachloride and/or dichlorosilane is provided. In the improved process the dopant impurities are complexed by heating the silicon bearing compound and adding a metered amount of oxygen.

Figure 2:
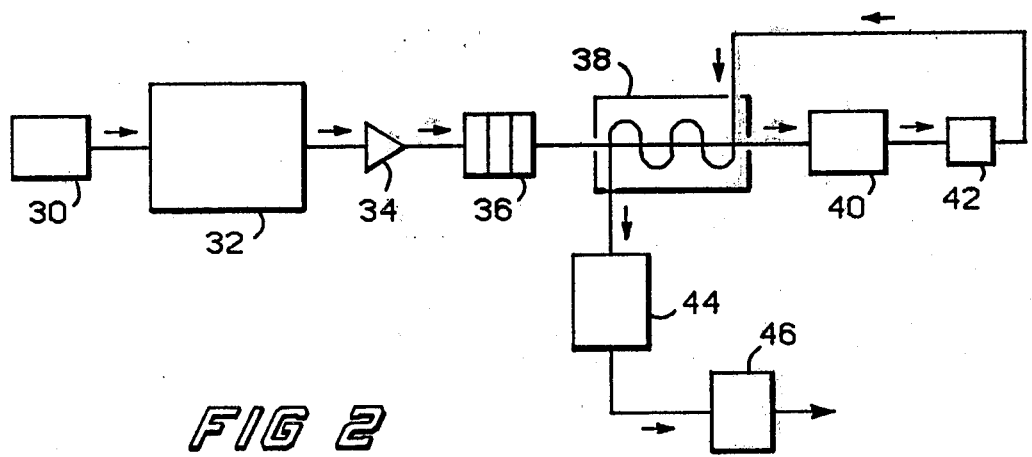
FIG. 2 is a flow diagram illustrating apparatus for purification in accordance with the invention.

Apparatus suitable for carrying out the purification process is illustrated in FIG. 2. A silicon source material 30 enters the purification system and, for convenience and uniformity, flows into a ballast tank 32. The silicon source material is in a gaseous or liquid state and may be, for example, a saturated hydrogen-trichlorosilane or hydrogen-dichlorosilane gas mixture or the halosilane product stream from a polycrystalline silicon reactor apparatus. The latter is comprised mainly of trichlorosilane and silicon tetrachloride with small amounts of dichlorosilane. From the ballast tank the silicon bearing material passes through a pump 34 and particulate filters 36 to a gas/gas heat exchanger 38 in which the material is initially warmed. After prewarming in the heat exchanger the material, now gaseous, is mixed at 40 with a carefully controlled amount of oxygen. The mixture then passes through a primary heater 42 where it reached the desired reaction temperature. Adding the oxygen and heating the stream of silicon bearing gas results in a chemical reaction (to be described below) which complexes the impurities in the gas stream. The heated gas stream then passes again through the heat exchanger where the heat is imparted to the incoming gas stream. The now cooled gas or liquid stream is optionally collected in a holding tank 44, and then continues on to a separator 46 which can be, for example, a conventional distillation apparatus where the complexed impurities are separated from the silicon gas stream. The purified silicon gas stream is then in condition for injection back into the polycrystalline silicon deposition apparatus.

Monitoring reactions in the above described apparatus as a function of temperature by standard gas chromatography mass spectroscopy (GCMS) provides a determination of the lower temperature limit for the reaction. The lower temperature limit, i.e., the minimum temperature required for the reaction, is determined by the functional groups of the silicon bearing material. As the number of hydrogen atoms attached to the silicon atom are increased, the temperature at which the material reacts with oxygen is decreased. When the silicon source material is HSiCl$_3$ or mixtures of HSiCl$_3$ and SiCl$_4$, no reaction is observed between the O$_2$ and HSiCl$_3$ at temperatures below 170° C. When the silicon source material is dichlorosilane or contains admixtures of dichlorosilane, the lower temperature limit is about 60° C.

At temperatures higher than the lower temperature limit the oxidation of HSiCl$_3$ or H$_2$SiCl$_2$ is rapid and consumption of oxygen is complete. No trace of O$_2$ is detected at these higher temperatures by the GCMS.

For a reaction between oxygen and trichlorosilane the major trichlorosilane oxidation products are examined; for reaction temperatures between about 170° C. and 250° C. one small chain species predominants. The resultant oxidation product of trichlorosilane formed in this temperature range has a molecular weight of m/e=250 which is consistent with the following structure:

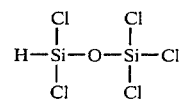

At higher temperatures, higher molecular weight species result consistent with linear and cyclic compounds containing three and four silicon atoms.

It is believed that the oxidative purification of trichlorosilane can be described by the following equations:

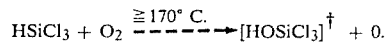

The intermediate product indicated by the dagger then reacts with an impurity such as a chlorinated impurity compound represented by XCl$_3$ as follows:

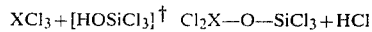

where X represents the primary dopant impurity such as boron, phosphorus, arsenic or aluminum.

Competing with the XCl$_3$ reaction is the following side reaction:

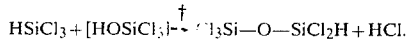

The initial step in this process is the formation of a Cl$_3$Si—OH intermediate. The evidence for this type of species is that the final impurity containing reaction product is in the form of

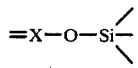

species which would originate from a $>X-Cl$ species reacting with

The driving force in this reaction is the thermodynamically favorable formation of the strong X—O and H—Cl bonds.

At temperatures greater than about 300° C. a more complex reaction occurs and intra and inter species thermally induced polysiloxane rearrangement products are formed. No additional purification is observed at these higher temperatures indicating that the thermal rearrangement products are not reactive with impurity compounds of the form $XCl_3$ such as $BCl_3$ or $PCl_3$.

When the primary dopant is in the form of a hydride such as diborane ($B_2H_6$), phosphine ($PH_3$) or arsine ($AsH_3$), oxidation purification is believed to proceed by two alternative pathways. In the first pathway, representing the dopant hydride by $XH_3$, $$XH_3 + O_2 \longrightarrow [H_2X-OH]^\dagger + 0.$$

Then

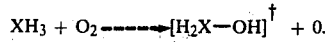

In the second pathway, $$HSiCl_3 + O_2 \rightarrow [H-O-SiCl_3]^\dagger + 0.$$

Then
$$XH_3 + [H-O-SiCl_3] \xrightarrow{\dagger} H_2X-O-SiCl_3 + H_2.$$

In the first pathway, oxygen reacts directly with the primary dopant to form the $[H_2X-OH]^\dagger$ intermediate. Once formed this species readily reacts with an Si—Cl bond to liberate HCl and form a species of the type

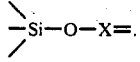

In the second pathway, oxygen initially reacts with the chlorosilane forming an $[H-O-SiCl_3]$ intermediate which reacts with the hydride to form a

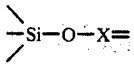

species and to liberate $H_2$.

When the silicon source material is dichlorosilane or a mixture including dichlorosilane, it is believed that the oxidative purificatiion is achieved by the following reactions:

$$H_2SiCl_2 + O_2 \xrightarrow{\geq 60° C.} [H-O-SiHCl_2] + 0.$$

The reaction intermediate $[H-O-SiHCl_2]^\dagger$ then reacts with a chlorinated dopant impurity as $$XCl_3 + [H-O-SiHCl_2] \xrightarrow{\dagger}$$
$$Cl_2X-O-SiHCl_2 + HCl.$$

The reaction sequence is analogous to that with $HSiCl_3$, with the driving force being the formation of stable X—O bonds and the liberation of HCl.

The oxidative purification of silicon source materials including dichlorosilane wherein the dopant impurity is in the form of a hydride proceeds in a manner similar to that for trichlorosilane.

The incorporation of an impurity into the siloxane chain, i.e., the formation of the

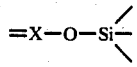

type species, raises the boiling point of the impurity containing species considerably. During a subsequent distillation process these higher boiling materials are readily separated from the chlorosilane yielding chlorosilanes essentially free from the original impurity contamination.

Other techniques for separating the impurity containing complex from the silicon source material can also be employed. These techniques include, for example, the use of activated charcoal filters to absorb the complexes, gas chromatography, the use of molecular sieves, and the like.

The initial oxidation of the silicon source material and the competing side reaction represent source material which is sacrificed in the purification process. To optimize the process it is desirable that this loss of source material be minimized. Under laboratory conditions it has been determined, for example, that 1.0 mole of $O_2$ reacts to complex about 0.38 moles of $BCl_3$ under the conditions specified above. The amount of oxygen necessary to purify the silicon source material can thus be adjusted depending on known impurity levels. In general about 0.01 to 0.2 mole percent of oxygen will be adequate to remove from the source material impurity compounds at the levels normally found without resulting in too severe a loss of the source material itself.

The quantity of $HSiCl_3$ or $H_2SiCl_2$ consumed during the purification process is reduced further by diluting the $HSiCl_3$ or $H_2SiCl_2$ to be purified with high purity $SiCl_4$. In the case of $HSiCl_3$, for example, the initial oxidative purification step is identical with or without $SiCl_4$, namely $$HSiCl_3 + O_2 \rightarrow [HOSiCl_3]^\dagger + 0.$$

In addition to reacting with the impurity, the [HOSiCl_3] reacts with $SiCl_4$ as follows:

$$SiCl_4 + [HOSiCl_3] \xrightarrow{\dagger} Cl_3SiOSiCl_3 + HCl.$$

In purifying mixtures of $HSiCl_3$ and $SiCl_4$ and/or $H_2SiCl_2$, such as the product mixture recovered from the silicon deposition process, by low level oxidation, the $HSiCl_3$, $SiCl_4$ and $H_2SiCl_2$ are all found to be greatly reduced in impurity contamination.

The following non-limiting examples will further serve to describe the invention and to illustrate preferred embodiments of the invention. Examples I–III are typical laboratory-type examples performed under controlled conditions to illustrate various aspects of the invention and to define optimum process parameters. Example IV relates to the oxidative purification of low quality chlorosilanes recovered in the process loop of a polycrystalline silicon production facility.

EXAMPLE I

Nitrogen at a flow rate of about 0.2 liters per minute is bubbled through a tank filled with about 3000–3500 grams of $HSiCl_3$. As the nitrogen gas bubbles through the $HSiCl_3$, the nitrogen becomes saturated and forms a $HSiCl_3/N_2$ vapor combination. To test the effectiveness of the purification process this vapor is then intentionally contaminated with known quantities of $BCl_3$. High concentrations (about 1.0% in $HSiCl_3$) of $BCl_3$ are used to facilitate analysis of the purification data. The contamination with $BCl_3$ is accomplished by bubbling nitrogen gas through a tank containing about 500 milliliter $BCl_3$ to form a saturated $BCl_3/N_2$ vapor combination which is then mixed with $HSiCl_3/N_2$ vapor at a selected rate.

To test the effectiveness of various oxygen concentrations and reaction temperatures on the purification process both oxygen concentration and temperature were maintained as variables. Concentration of boron in the $HSiCl_3$ vapor is monitored both before and after the oxidation reaction. Below about 170° C. no reaction is observed between the $O_2$ and the $HSiCl_3$. At temperatures greater than about 170° C. the oxidation of $HSiCl_3$ is rapid and the consumption of the additive oxygen complete.

Specifically, flow rates and pressures are adjusted to deliver $3.6 \times 10^{-2}$ moles/min. of $HSiCl_3$ and $3.6 \times 10^{-4}$ moles/min. of $BCl_3$ in the gas stream. The gas stream is passed through a furnace tube heated to about 180° C. with a residence time of about 20 seconds in the heated tube. The effluent stream is sampled approximately every 15 minutes with GCMS equipped for on-line manual injection.

After calibration of the GCMS against various representative $BCl_3$ flow rates, oxidative purification is initiated. Oxygen is added at a flow rate of $2.0 \times 10^{-4}$ moles/min.; the resulting $BCl_3$ in the effluent stream is measured to be reduced to $2.8 \times 10^{-4}$ moles/min. The oxygen flow rate is increased to $4 \times 10^{-4}$ moles/min. and the $BCl_3$ in the effluent drops further to $2.1 \times 10^{-4}$ moles/min.

The oxidative purification is repeated at temperatures of 200°, 220°, 250°, 300°, 350°, 400°, 450° and 500° C. Reproducible results are obtained for temperatures less than or equal to 300° C. Preferably the process is carried out at about 200° C. Above 300° C. polysiloxane residue is found to build up in the GCMS transfer lines. Also, slightly less complexing of the $BCl_3$ is found to occur at temperatures over about 300° C.

Analysis of the data indicates about 1.0 moles of oxygen reacts with the $HSiCl_3$ to complex about 0.38 moles of $BCl_3$ at temperatures between about 170° C. and about 300° C. Increased mechanical and process problems are encountered at temperatures above about 300° C.

EXAMPLE II

Nitrogen at a flow rate of about 0.2 l/min. is bubbled through a tank containing about 5000 gm of $SiCl_4$ at a pressure of about 101 KPa and a temperature of about 45° C. to produce a saturated $SiCl_4N_2$ vapor with a molar ratio of $SiCl_4$ to $N_2$ of 1:2. This mixture is combined, through a gas manifold, with an equal flow (0.3 l/min) of $H_2SiCl_2$ doped with $B_2H_6$ at 1.0%. The gas mixture is passed through a furnace and the heated gases are sampled by on-line GCMS as in Example I. Oxygen is added to the chlorosilane/boron hydride/nitrogen mixture at a rate of 6.0 ml/min to provide a molar $O_2$ concentration of twice the $B_2H_6$ concentration, but equal to the "$BH_3$" concentration. Temperature of the furnace is varied. For temperatures greater than or equal to about 60° C. the GCMS peak for $B_2H_6$ is reduced to about 20% of its original value. The result indicates that oxidative purification of $H_2SiCl_2$ is effective at temperatures greater than or equal to about 60° C. and that 1 mole of $O_2$ reacts with about 0.8 moles of "$BH_3$" or with about 0.4 moles of $B_2H_6$. The oxidative complexing efficiency of boron hydride thus appears to be about twice that of the boron halide.

EXAMPLE III

A charcoal bed about 75 mm in diameter and 1 m in length is activated by a slow hydrogen purge at 350° C. for 2 hours. A portion of the partially oxidized mixture from Example II is passed through the activated charcoal bed and the output of the bed is monitored by GCMS. Initially, only nitrogen is found to pass through the bed. After about 15 minutes, $H_2SiCl_2$ and $SiCl_4$ are also found. Only after several more minutes, after the bed is saturated, are $B_2H_6$ and oxidized complexes also observed.

EXAMPLE IV

Apparatus as depicted in FIG. 2 is used to purify the low quality chlorosilane effluent from a polycrystalline silicon reactor. The composition of this effluent includes about 25% $HSiCl_3$, 5% $H_2SiCl_2$ and the balance $SiCl_4$ at a flow rate of about 12 liters of liquid per hour. Additionally, the effluent includes unacceptably high levels of donor and acceptor impurities.

The chlorosilane mixture is passed through the oxidative purification apparatus continuously for 240 hours. The mixture is heated to about 180°–220° C., but no oxygen is added. The mixture is then distilled to remove $SiCl_4$ to optimize the mixture for polycrystalline silicon production. Following distillation, the mixture contains 70–75% $HSiCl_3$, 10–15% $H_2SiCl_2$ and balance $SiCl_4$.

The output of the apparatus is sampled every 24 hours and each sample is divided into two parts. One part is analyzed for impurity concentration using wet chemical analysis. The second part is used for polycrystalline silicon deposition followed by seven pass float zone refinement and electrical carrier analysis. Without oxidative purification, the samples are found to contain 0.75 to 3.0 parts per billion (ppb) acceptor (principally boron) and 0.65 to 2.5 ppb donor (principally phosphorus).

Flow of the chlorosilane mixture through the purification apparatus is continued for an additional 240 hours, but, in accordance with the invention, oxygen at a level of 0.01 to 0.2 moles per mole $HSiCl_3$ is mixed with the chlorosilane mixture. Samples are collected, distilled and analyzed as before. Impurity analysis of these samples indicate the acceptor level is reduced to less than 0.1 ppb and the donor level to less than 0.18 ppb.

Following each of the above examples the purification apparatus is dismantled and examined. No observable build-up of oily or solid residues is found, indicating that no long chain molecules are formed during the purification.

Thus it is apparent that there has been provided, in accordance with the invention, a process for purifying silicon source materials which fully meets the objects and advantages set forth above. Acceptor and donor impurities are effectively removed from silicon source material by controlled oxidation. While the invention has been described in terms of specific embodiments thereof it is not intended that the invention be so limited. Variations and modifications in the purification apparatus and in the application of the invention will of course be apparent to those skilled in the art. For example, those skilled in the art will recognize that in the production of $HSiCl_3$ from either the reaction of HCl and metallurgical grade silicon or from the reaction of $SiCl_4$, metallurgical grade silicon and hydrogen, oxidative purification in accordance with the invention can be applied to simplify the necessary purification process to yield higher purity silicon source material at a lower cost. Accordingly, it is intended to embrace all such variations and modifications as fall within the scope of the invention.

We claim:

1. A process for removing dopant impurity including one or more of boron, phosphorous, arsenic and aluminum in the form of chlorides, hydrides, or intermediate compounds containing both hydrogen and chlorine from a silicon source material including trichlorosilane or dichlorosilane which comprises the steps of: heating said material in gaseous form to a temperature between about 170° C. and about 500° C. with oxygen to form impurity containing siloxane complexes; and separating said complexes from said source material.

2. The process of claim 1 wherein said silicon source material comprises trichlorosilane and silicon tetrachloride.

3. The process of claim 1 wherein said silicon source material comprises trichlorosilane and dichlorosilane.

4. The process of claim 1 wherein said oxygen is present in a ratio with said trichlorosilane or dichlorosilane of about 0.01 to about 1.0 mole percent.

5. The process of claim 1 wherein said temperature is between about 170° C. and about 300° C.

6. The process of claim 5 wherein said temperature is about 200° C.

7. A process for removing dopant impurity including one or more of boron, phosphorous, arsenic, and aluminum in the form of chlorides, hydrides or intermediate compounds containing both hydrogen and chlorine from a silicon source material including dichlorosilane which comprises the steps of: heating said material in gaseous form to a temperature between about 60° C. and about 300° C. with oxygen to form impurity containing siloxane complexes; and separating said complexes from said source material.

8. The process of claim 7 wherein said silicon source material comprises dichlorosilane and silicon tetrachloride.

9. The process of claim 7 wherein said silicon source material comprises trichlorosilane and dichlorosilane.

10. The process of claim 7 wherein said oxygen is present in a ratio with said dichlorosilane of about 0.01 to about 1.0 mole percent.

11. The process of claim 7 wherein said temperature is between about 170° C. and about 300° C.

* * * * *